United States Patent Office 3,168,341
Patented Feb. 2, 1965

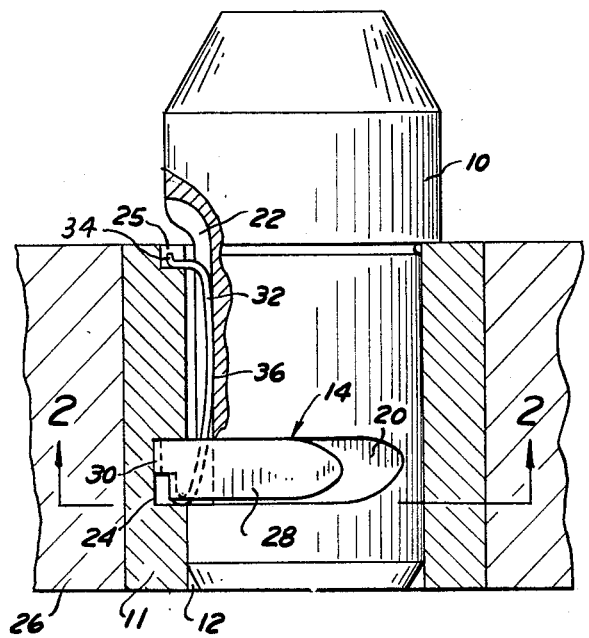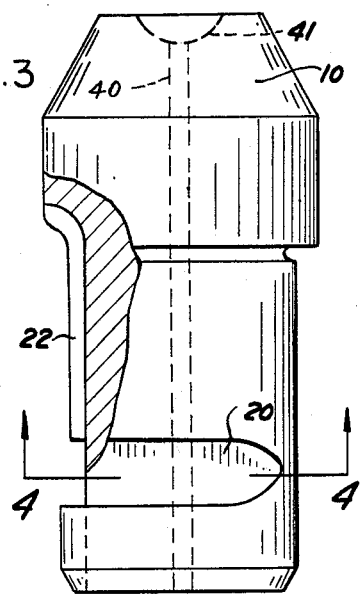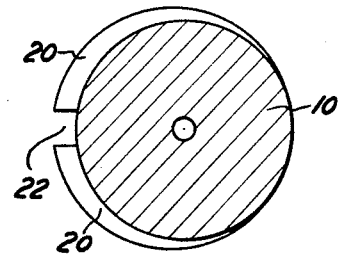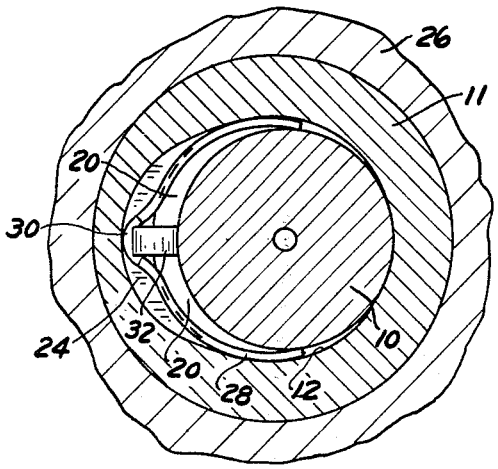

3,168,341
SPRING CLIP RETAINER
Lucien J. J. Beaudet, 461 W. Marshall, Ferndale, Mich.
Filed Dec. 12, 1963, Ser. No. 330,051
2 Claims. (Cl. 287—119)

This application relates to spring clip retainers for pins and shafts.

Male members, such as locating pins, shafts, bushings, etc., used in machine shop practice, commonly formed as elongated cylindrical male members, are located in female holes of blocks or castings.

Presently such male members are held in place by means of lock screws.

This application relates to and discloses a spring clip for releasably locking and holding in place such elongated cylindrical male members, with such members disposed in elongated cylindrical holes of female members and releasably locked in such holes by the spring clips of the invention.

One embodiment of the invention is disclosed in the appended drawing, as a preferred example. In such drawing:

FIG. 1 is an elevation cross-section view of all of the parts in combination.

FIG. 2 is a transverse sectional view as if on line 2—2 of FIG. 1.

FIG. 3 is an elevation view of a male member per se.

FIG. 4 is a transverse sectional view as if on line 4—4 of FIG. 3.

The drawings disclose in combination an elongated cylindrical male member 10, a female member 11 having an elongated cylindrical hole 12 and a spring clip 14 for releasably locking said male member in said hole.

Male member 10 has an annular intermediate horizontal groove 20 and a longitudinally extending elemental or vertical groove 22.

Female member 11 has recesses 24 and 25 located as shown. Recess 23 is arcuate and larger than recess 25 and is located to be horizontally alined with the annular groove 20 of male member 10 when the parts are properly positioned. Recess 25 is at the upper end of groove 22.

Female member 11 is generally in the form of a sleeve disposed in a block or casting 26 but the female member may comprise the block or casting itself so long as it is formed with the cylindrical hole 12 and the recesses 24 and 25.

Spring clip 14 has an arcuate gripping portion 28 located and shaped to be received in annular groove 20 of male member 10, but dimensioned to grip around such male member. It also has an oppositely extending projection 30 located and shaped to be received in arcuate recess 24 of female member 11. It also has an elemental shank portion 32 located and shaped to be received in elemental groove 22 of male member 10. It also has a handle portion 34 at the upper end of the shank portion 32 and overlying recess 25 in the upper end of the female member 11.

Gripping portion 28 projects inwardly from shank portion 32 and is springy, with an inherent tendency to contract and grip male member 10 when it is disposed in annular groove 20.

Shank portion 32 is bowed inwardly so that its center part 36 is well inside elemental groove 22 of male member 10.

Handle portion 34 projects outwardly from shank portion 32.

The use of the parts is as follows:

A spring clip may be assembled on a male member 10 with its gripping portion 28 in groove 20 to enable the assembly to be moved downward into hole 12 of female member 11 until projection 30 snap locks itself into arcuate recess 24 of female member 11, whereupon handle 34 snaps into recess 25. This locks male member 10 in female member 11 in properly located position, axially and radially.

For removal of male member 10 from female member 11, handle 34 is released from recess 25 and moved into male member groove 22. Now male member 10 with spring clip 14 on it, may be rotated, whereupon arcuate recess 24 will cam projection 30 inwardly to permit male member 10 with clip 14 on it, to be lifted out of female member 11.

To facilitate such rotation of male member 10, it is formed with a tool receiving socket 40, such as a slot for a screwdriver, or a hex hole for an Allen head wrench.

For venting hole 12 of female member 11, particularly where hole 12 is a "blind" hole or socket, a small hole 41 may be formed in male member 10, or groove 22 may be extended to the lower end of member 10.

Now having described the embodiment heretofore disclosed, reference should be had to the claims which follow.

I claim:

1. In combination, an elongated, cylindrical male member; a female member having an elongated cylindrical hole dimensioned for closely fitting and releasably receiving said male member; and a manually releasable spring clip between the male and female members for releasably locking said male member in said hole and formed separate from and disconnected from each of said members;

said male member having a transverse external arcuate groove near its lower end and a longitudinally extending upwardly extending external elemental elongated groove whose lower end merges with the center portion of the arcuate groove and whose upper end is above the upper end of the female member hole;

said female member hole having an internal arcuate recess at its lower end located complementarily to said arcuate groove of the male member when the members are assembled relatively; and a small socket at the upper end of the hole in the female member and exposed above said hole and alined longitudinally with the central part of said recess;

said spring clip having an arcuate gripping portion of C-shape at its lower end located and shaped to be received in the arcuate groove of the male member and engage around it; said spring clip also having an outwardly extending projection located in the center of the gripping portion and shaped to be received in the arcuate recess of the female member; said clip also having a longitudinally and upwardly extending elemental shank portion connected to the interior of the arcuate gripping portion and located and shaped to be received in the elemental groove of the male member; and an exposed accessible handle portion at the upper end of the shank portion overlying the upper end of the female member and received in the socket at the upper end of the hole in said female member to be accessible for movement of the spring clip towards the male member in the elemental groove of the latter; said handle portion extending radially away from the male member into said socket;

said male member, with the spring clip thereon, and the female member, being in assembled relationship, with the male member being inside the female member, and with the arcuate recess and arcuate groove being disposed in opposed relationship to each other; and with the center of curvature of the arcuate recess being laterally spaced from the center of curvature of the arcuate groove; and with the radius of curvature of the groove and recess being proportioned so that the ends of the arcuate recess merge smoothly with the ends of the arcuate groove;

and with the upper surface of the arcuate recess overhanging the spring clip gripping member projection at that time in the center of such recess;

whereby, as the male member and the spring clip gripping portion thereon are rotated together in the female member, the spring clip projection, which at the start is within the arcuate recess center is gradually moved with a camming action, around the arcuate recess towards an end thereof and out of such arcuate recess into the clear and unrecessed part of the female member hole, becoming thus free to be lifted, with the male member, out of such hole;

the gripping portion being springy with an inherent tendency to contract.

2. Means according to claim 1 wherein the shank portion is bowed between its ends towards the male member so that its center part is well inside the elemental groove of the male member.

References Cited by the Examiner
UNITED STATES PATENTS

| | | | |
|---|---|---|---|
| 2,156,486 | 5/39 | Wertz. | |
| 2,487,470 | 11/49 | Osborn | 285—321 X |
| 2,755,106 | 7/56 | Brennan et al. | 285—319 X |
| 3,082,024 | 3/63 | Boylan | 285—319 X |

CARL W. TOMLIN, *Primary Examiner.*